May 26, 1931. W. WAIT, JR 1,806,724
GUN MOUNT FOR AIRCRAFT
Filed Feb. 25, 1929 4 Sheets-Sheet 1

INVENTOR
William Wait, Jr.,
BY Eyre Scott & Keel
ATTORNEYS

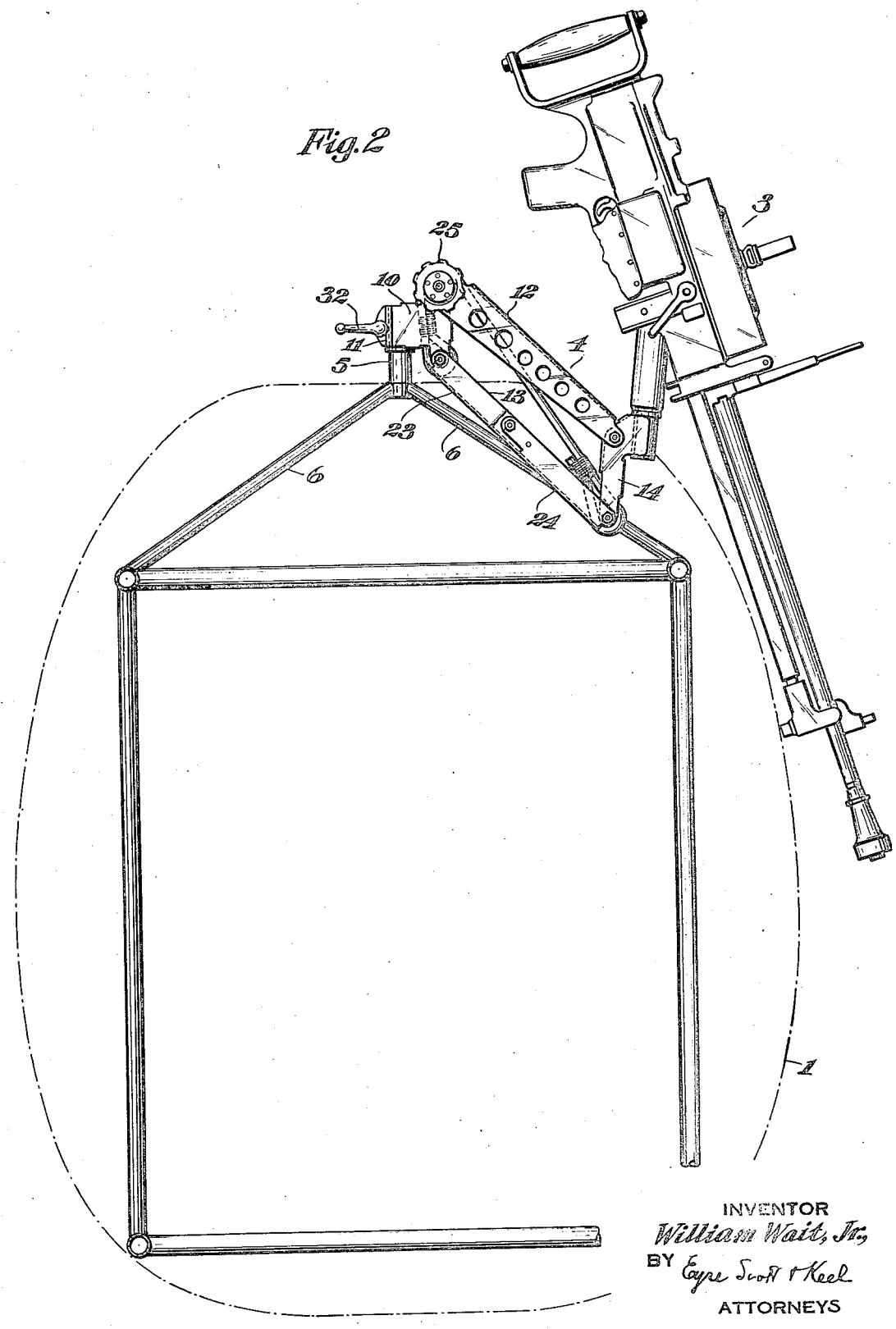

May 26, 1931. W. WAIT, JR 1,806,724
GUN MOUNT FOR AIRCRAFT
Filed Feb. 25, 1929 4 Sheets-Sheet 3
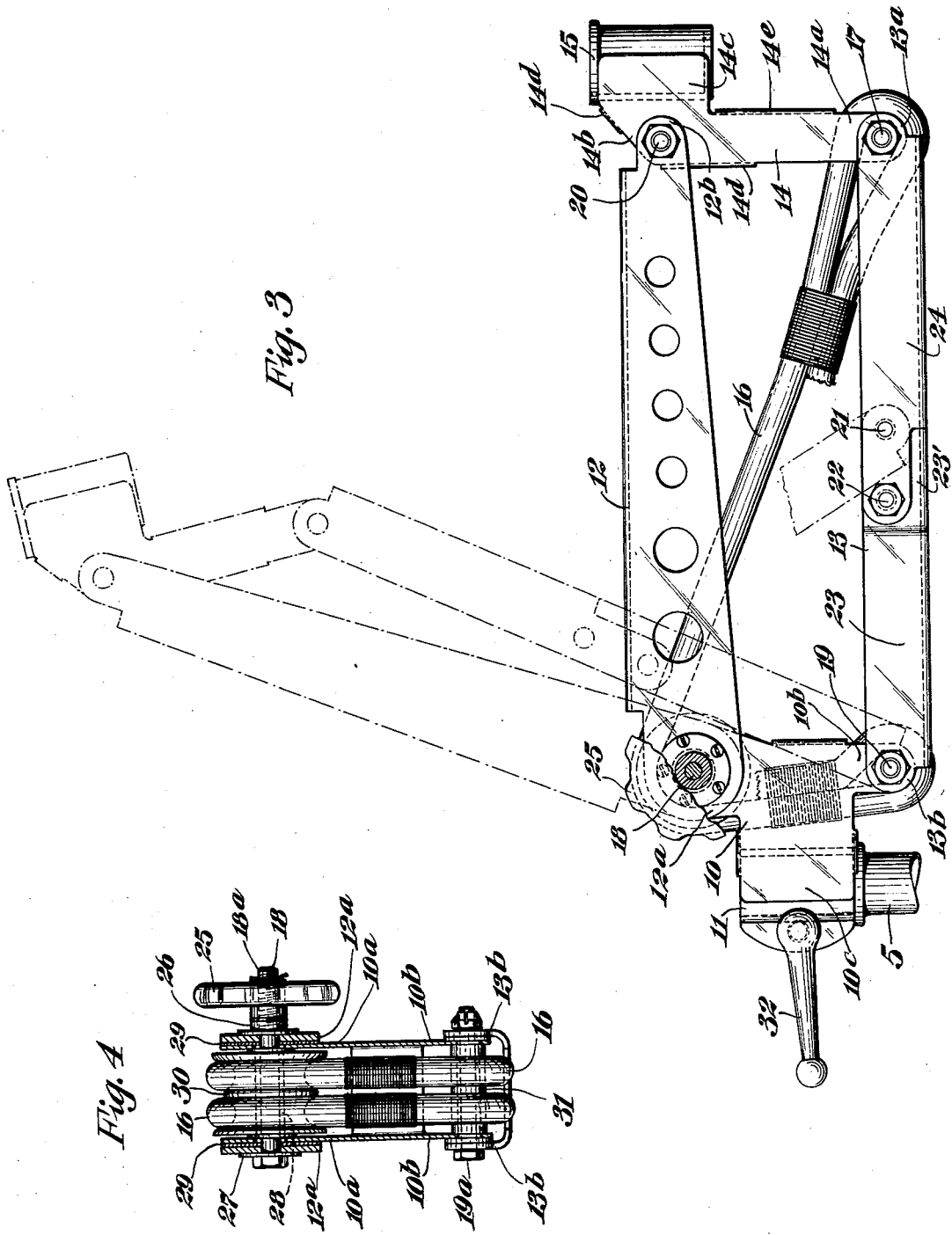
INVENTOR
William Wait, Jr.,
BY Eyre Scott & Keel
ATTORNEYS May 26, 1931.  W. WAIT, JR  1,806,724
GUN MOUNT FOR AIRCRAFT
Filed Feb. 25, 1929   4 Sheets-Sheet 4
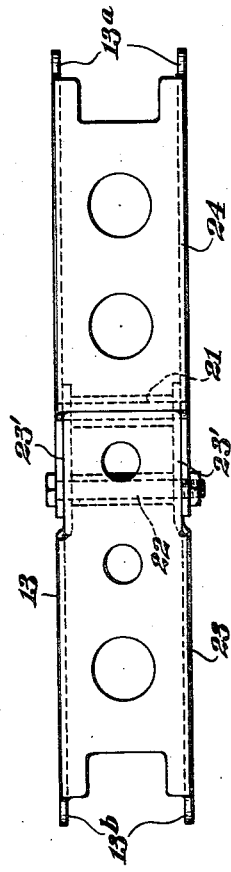
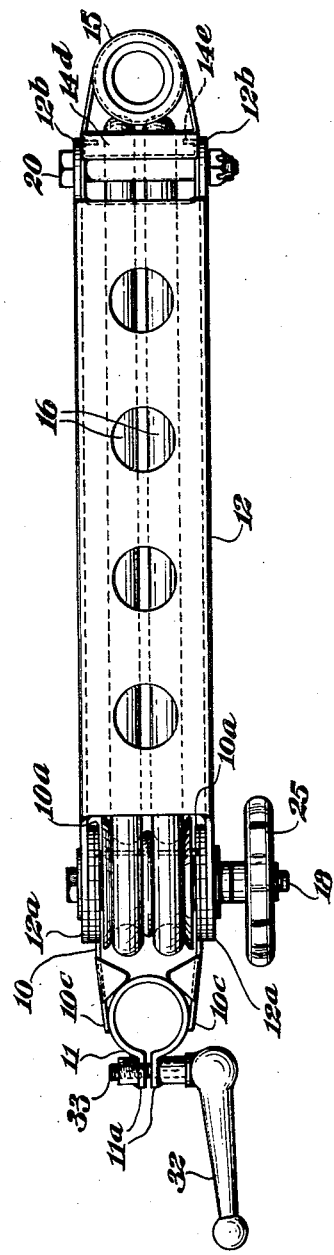
INVENTOR
William Wait, Jr.,
BY Eyre Scott & Keel
ATTORNEYS Patented May 26, 1931

1,806,724

UNITED STATES PATENT OFFICE

WILLIAM WAIT, JR., OF GARDEN CITY, NEW YORK, ASSIGNOR TO CHANCE M. VOUGHT, OF GREAT NECK, NEW YORK

GUN MOUNT FOR AIRCRAFT

Application filed February 25, 1929. Serial No. 342,363.

This invention relates to gun mounts particularly adapted for aircraft.

One object of the invention is a novel mount for machine guns facilitating the maneuvering of the gun from one position to another to point the same in any direction desired by the gunner with a minimum of effort on his part. A further object of the invention is a mount which is characterized by its lightness in weight, and by its compact character as compared with prior means. A still further object of the invention is a mount of this general character which is further characterized by its simplicity in construction and economy in manufacture.

For a better understanding of the invention reference may be had to the accompanying drawings illustrating one embodiment thereof wherein:

Fig. 2 is a view thereof from a different angle,

Fig. 3 is a side view of the mount,

Fig. 4 is an end view of the mount partly in section,

Fig. 5 is a bottom view of certain elements of the mount, and

Fig. 6 is a view of certain other structural elements of the mount.

Figure 1:
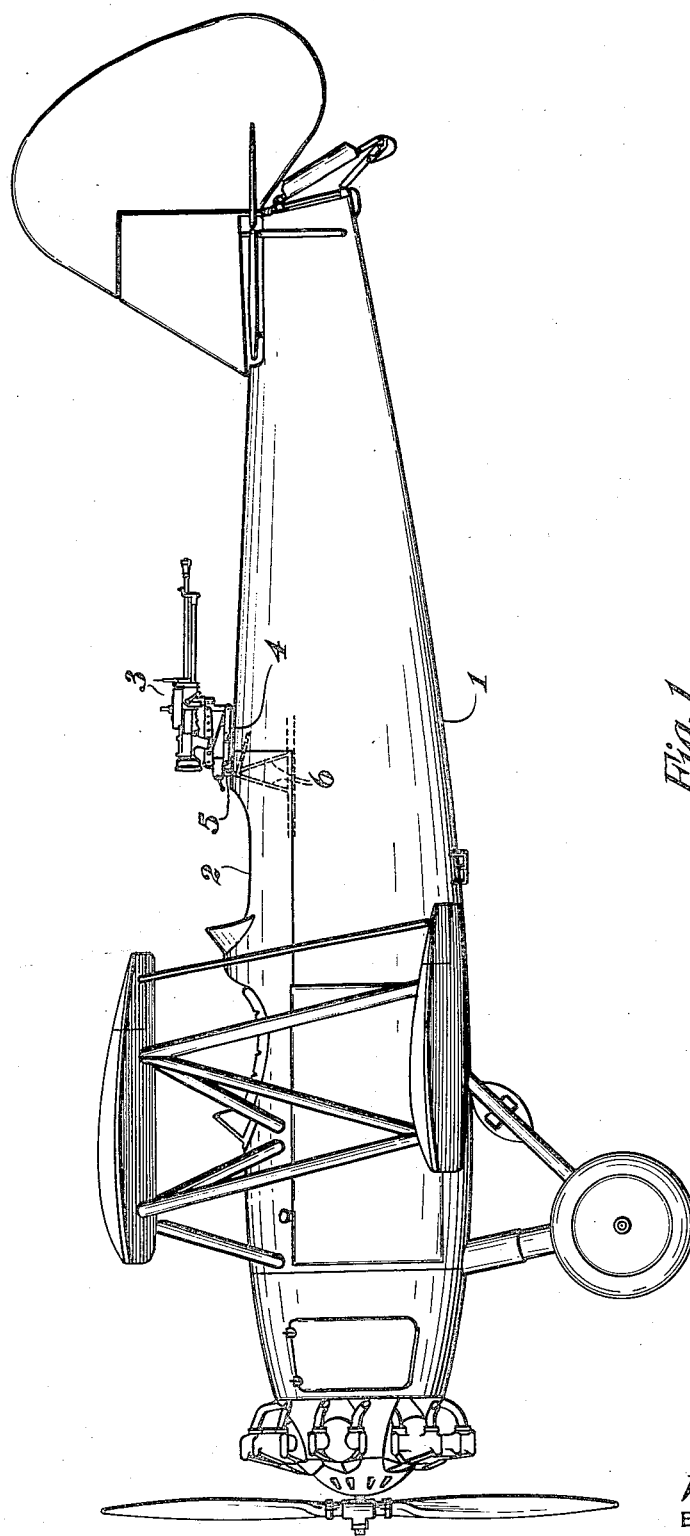
Fig. 1 is a side view of an aeroplane on which my novel gun mount is mounted.

Referring to the drawings, I have shown my invention as mounted upon an aeroplane embodying the fuselage 1 and the gunner's cockpit 2. I have designated a machine gun unit 3 as mounted upon the fuselage adjacent the cockpit 2 by means of my novel gun mount indicated generally by the numeral 4 in Fig. 1. At the rear of or adjacent to the cockpit there is mounted a trunnion bearing 5, this bearing being carried by any suitable framework, such for example as the frame members 6 extending crosswise of the fuselage and secured in any suitable manner to the framework thereof. The machine gun unit and mount proper are carried by this trunnion bearing 5 for movement in horizontal planes thereabout as a vertical axis. The rotatable part of the mount includes a supporting member 10 having a socket 11 for the reception of the trunnion bearing 5. The member 10 is formed from sheet metal and at its intermediate part is U-shaped with the legs thereof secured to the socket 11 in any suitable manner, as for example by welding. The member 10 serves as a relatively fixed link of a parallelogram of links including the relatively adjustable links 12, 13, and 14, the links 12 and 13 being parallel and the links 10 and 14 being parallel. The link 14 carries at its upper end a socket 15 for the machine gun unit 3, the latter being rotatable in planes at right angles to the axis of the socket 15 and also having a further adjustment for elevation in the standard and usual way. The weight of the machine gun unit on the socket 15 is normally balanced by an elastic cord or cable 16 the latter having one end connected around the axis 17 of the parallelogram and after passing around the axis 18 of the parallelogram is attached at its free end to the axis 19 of the parallelogram. The arrangement is such that the tension of the elastic cord or cable 16 varies with the moment of the weight of the gun about the member 10, the length of the cord, for example, decreasing as the gun is lifted towards the position indicated in dot and dash lines. For facilitating the removal and replacement of the cord 16 I have provided special means for collapsing the parallelogram. For example, the member 13 as indicated in dotted lines is breakable midway its length to swing about an axis 21, a special locking pin 22 being provided for locking the two parts of the member 13 as a rigid continuation of each other. The members 12, 13 and 14 of the parallelogram are like member 10 formed of sheet metal and preferably of the light metal, as for example of duralumin. The two parts 23 and 24 of the member 13 are U-shaped and the inner end 23′ of the part 23 has the legs reduced in dimension as indicated to fit telescopically within the legs of the U-shaped member 24. As indicated in Fig. 5 both parts 23 and 24 have registered openings for the reception of screwing bolts or pins passing through the axes 21 and 22.

When it is desired to collapse the member 13 it is only necessary to remove the pin or bolt 22. The member 13 at its outer end is provided with similar openings formed in the spaced parts 14a of the link 14 for the reception of a bolt or pin corresponding to the axis 17. The member 14 is likewise provided at its upper end with a pair of spaced bearings and the upper member 12 is likewise U-shaped and has a pair of bearing brackets 12b which straddle the bearings 14b of the member 14, a suitable bolt or screwing pin being provided in the axis 20. The socket member 15 may be secured to the parallelogram member 14 in any suitable manner, as for example being embraced by and welded to U-shaped arm 14c which extends forwardly. The U-shaped member 14 includes the bridge or bent parts 14d and the inwardly turned flanges 14e. The upper parallelogram member 12 is provided with bearing members 12a which straddle the bearing members 10a of the member 10 and these bearing parts are provided with registering openings for the reception of a bolt 18a the axis of which is indicated at 18. The bolt 18a is screw-threaded, as indicated at the right hand end in Fig. 4, and a tightening and friction adjusting wheel 25 is provided having internal screw threads for adjustments on the screw-threaded end of the bolt 18a. A spacer or washer 26 is disposed around the bolt 18a between the hub of the wheel 25 and one of the bearing members 12a and a spacer or washer 27 is similarly disposed at the other end of the bolt, between the bolt head and the other bearing member 12a. A spacer sleeve 28 is provided about the bolt with its ends engaging the bearing members 10a to limit their inward movement when the wheel 25 is tightened. Between the bearing members 12a and 10a are disposed friction means indicated at 29 and around the sleeve is disposed a pulley 30 for accommodating the elastic cords 16, two of these cords being illustrated. If desired a further friction means may be disposed between the pulley 30 and the bearing members 10a. The member 13 at its inner end is also provided with the spaced bearing parts 13b which co-operate with similar bearing parts 10b of member 10, the former straddling the latter and the spacer sleeve 31 is disposed between the bearing members 10b to limit the inward movement of the latter when the parts are screwed together by the bolt 19a.

With the construction and arrangement shown the elastic cord or cable 16 may be adjusted to approximately balance the weight of the gun unit or units upon the socket or swivel 15 and with such fixed adjustment the weight of the gun is substantially balanced in any vertical position of the socket 15 the shortening and lengthening of the cord 16 corresponding to the shortening or lengthening of the moment arm. The friction of the parallelogram movement may be adjusted by the wheel 25 to secure steadiness of the parallelogram in any vertical plane and the gunner is only required to overcome this friction and the inertia since the weight of the gun is automatically balanced by the cord 16. I have indicated at 32 a hand manipulated member for locking the parallelogram in any horizontal adjustment, this member 32 functioning to lock the member 10 to the trunnion bearing 5. The socket 11 is split on its rear side and provided with ears 11a which are formed with openings for the reception of a tightening bolt 33, the latter forming a part of or fixed to handle 32. A nut 34 which may be welded to one ear 11a co-operates with the bolt 33 to tighten and lock the socket 11 about the trunnion 5. The gun may also be locked permanently against adjustments in vertical planes by the wheel 25. The gunner may very quickly lock and unlock the mount so as to enable him to effect a quick adjustment. The range of the adjustment possible is indicated in Fig. 2 where the gun is indicated as pointing substantially vertically downward over the side of the fuselage.

The whole of the gun mount may be made extremely light and, moreover, quite economically as compared with prior types of aircraft gun mounts. In the particular embodiment shown I have indicated only one gun. Two or more guns may be mounted as a unit upon the socket 15 if desired.

I claim:

1. In a gun mount for aircraft a parallelogram support including a frame member swivelly mounted on a trunnion bearing, a pair of parallel links pivoted at one end to said frame member at points spaced therealong, a second frame member pivoted to the other ends of said parallel links to complete the parallelogram, a gun support carried by said second named frame member, and tension means including an elastic member fastened to the parallelogram and disposed along the diagonal thereof and acting in opposition to the weight of the gun.

2. In a gun mount for aircraft a parallelogram support including a frame member swivelly mounted on a trunnion bearing, a pair of parallel links pivoted at one end to the upper and lower ends of said frame member, a second frame member pivoted at its upper and lower ends to the other ends of said parallel links, tension means including an elastic cord disposed along the diagonal of the parallelogram and a gun swivel support carried by said second named frame member, one of the parallel links being breakable and collapsible for the purpose set forth.

3. In a gun mount for aircraft a parallelogram support including a frame member swivelly mounted on a trunnion bearing, a pair of parallel links pivoted at one end to the upper and lower ends of said frame member, a second frame member pivoted at its upper and lower ends to the other ends of said parallel links, tension means including an elastic cord disposed along the diagonal of the parallelogram and a gun swivel support carried by said second named frame member, the parallelogram members being formed from light sheet metal the parallel links being of U-form.

4. In a gun mount for aircraft a parallelogram support including a frame member swivelly mounted on a trunnion bearing, a pair of parallel links pivoted at one end to the upper and lower ends of said frame member, a second frame member pivoted at its upper and lower ends to the other ends of said parallel links, tension means including an elastic cord disposed along the diagonal of the parallelogram and a gun swivel support carried by said second named frame member, said elastic cord being fastened to the corresponding ends of the two frame members and passing around the pivotal axis of the opposite end of the first frame member.

5. In a gun mount for aircraft a parallelogram support including a frame member swivelly mounted on a trunnion bearing, a pair of parallel links pivoted at one end to the upper and lower ends of said frame member, a second frame member pivoted at its upper and lower ends to the other ends of said parallel links, tension means including an elastic cord disposed along the diagonal of the parallelogram and a gun swivel support carried by said second named frame member, a friction adjusting means being provided for controlling the freedom of pivotal movement of the parallelogram.

6. In a gun mount for aircraft a parallelogram support including a frame member swivelly mounted on a trunnion bearing, a pair of parallel links pivoted at one end of the upper and lower ends of said frame member, a second frame member pivoted at its upper and lower ends to the other ends of said parallel links, tension means including an elastic cord disposed along the diagonal of the parallelogram and a gun swivel support carried by said second named frame member, a friction adjusting means being provided for controlling the freedom of pivotal movement of the parallelogram including a bolt passing through the pivotal axis at one end of the first named frame member with friction plates disposed between the bolt ends and the links, and screw-threaded means for tightening said devices.

7. In a gun mount for aircraft a parallelogram support including a frame member swivelly mounted on a trunnion bearing, a pair of parallel links pivoted at one end to the upper and lower ends of said frame member, a second frame member pivoted at its upper and lower ends to the other ends of said parallel links, tension means including an elastic cord disposed along the diagonal of the parallelogram and a gun swivel support carried by said second named frame member, the elastic cord being fastened at corresponding ends of the two frame members and passing along the diagonal of the parallelogram around the pivotal axis of the opposite link, one of said parallel links being divided into two parts pivoted to each other and provided with means for locking the parts as a continuation of each other to prevent pivotal movements.

8. A gun mount including a parallelogram support for moving the gun in the plane of the parallelogram and tension means fastened to the parallelogram and disposed along a diagonal thereof to act in opposition to the weight of the gun.

9. A gun mount for aircraft including a parallelogram support for moving the gun in the plane of the support, tension means disposed along the diagonal of the parallelogram and means for varying the friction of the parallelogram members.

10. A gun mount for aircraft including a parallelogram support for moving the gun in the plane of the support, tension means fastened to the parallelogram and disposed along the diagonal thereof to act in opposition to the weight of the gun and means for locking the parallelogram against adjustments in the plane of the support.

11. A gun mount of the character set forth in claim 10 wherein the parallelogram support is also adjustable in planes at an angle to the plane thereof and including means for locking the parallelogram support against movements in said planes.

12. A gun mount including a parallelogram support for adjustments in the plane of the support and means for varying the friction of said parallelogram support.

13. A gun mount of the character set forth in claim 12 wherein the support is swivelly mounted for adjustment in planes at an angle to the parallelogram support and including means for locking the support against said movements.

In testimony whereof, I have signed my name to this specification.

WILLIAM WAIT, Jr.